United States Patent
Kuwana et al.

(10) Patent No.: US 9,939,339 B2
(45) Date of Patent: Apr. 10, 2018

(54) PRESSURE TRANSMITTER DEVICE

(71) Applicant: HITACHI, LTD., Tokyo (JP)

(72) Inventors: Ryo Kuwana, Tokyo (JP); Daisuke Shinma, Tokyo (JP); Atsushi Fushimi, Tokyo (JP); Hideki Hanami, Tokyo (JP); Isao Hara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 116 days.

(21) Appl. No.: 15/075,485

(22) Filed: Mar. 21, 2016

(65) Prior Publication Data
US 2016/0299023 A1  Oct. 13, 2016

(30) Foreign Application Priority Data
Apr. 10, 2015 (JP) .................. 2015-080519

(51) Int. Cl.
*G01L 13/02* (2006.01)
*G01L 7/08* (2006.01)
*G01L 19/06* (2006.01)

(52) U.S. Cl.
CPC .............. *G01L 7/08* (2013.01); *G01L 13/025* (2013.01); *G01L 19/0645* (2013.01)

(58) Field of Classification Search
CPC ... G01L 7/00; G01L 7/08; G01L 13/00; G01L 13/02; G01L 13/025; G01L 13/026; G01L 19/00; G01L 19/06; G01L 19/0645
See application file for complete search history.

(56) References Cited

U.S. PATENT DOCUMENTS

| 2007/0205720 A1* | 9/2007 | Sparks ................... F04B 37/04 313/553 |
| 2013/0312531 A1 | 11/2013 | Hedtke |
| 2014/0096613 A1 | 4/2014 | Kuwana et al. |
| 2015/0107365 A1* | 4/2015 | Arita ........................ G01L 7/08 73/715 |

FOREIGN PATENT DOCUMENTS

| JP | 09113394 A * | 5/1997 | ............ G01L 13/02 |
| JP | 11351991 A * | 12/1999 | ............ G01L 13/02 |
| JP | 2014-089171 A | 5/2014 | |

OTHER PUBLICATIONS

Extended European Search Report received in corresponding European Application No. 16163195.7 dated Jul. 22, 2016.

* cited by examiner

*Primary Examiner* — Nguyen Ha
(74) *Attorney, Agent, or Firm* — Mattingly & Malur, PC

(57) ABSTRACT

Provided is a pressure transmitter device including: a pressure receiving diaphragm in contact with a measuring fluid; a fill fluid, in contact with an opposite side of the pressure receiving diaphragm to the other side in contact with the measuring fluid, for transferring a pressure received by the pressure receiving diaphragm from the measuring fluid to a sensor disposed at a position apart from the pressure receiving diaphragm; a hydraulic path filled with the fill fluid and connecting the pressure receiving diaphragm and the sensor; and an output circuit for measuring and outputting an absolute pressure of the measuring fluid or a differential pressure between measuring fluids based on the pressure received by the sensor, where a hydrocarbon absorbing material for absorbing hydrocarbon and a hydrogen occlusion material for occluding hydrogen are provided inside the hydraulic path.

7 Claims, 7 Drawing Sheets

PRESSURE TRANSMITTER DEVICE

BACKGROUND OF THE INVENTION

1. Field of the Invention

The present invention relates to pressure transmitter devices and pressure transmission methods and particularly to a pressure transmitter device which can be used in nuclear power plants, petroleum refining plants, chemical plants and the like in a preferable manner for measuring a pressure of a fluid or a pressure difference between two points and transmitting a detection signal thereof.

2. Description of the Related Art

Pressure transmitter devices transfer a pressure of a measuring fluid received by a diaphragm to a sensor by a fill fluid filling in a hydraulic path and externally transmits an electrical signal detected by the sensor. The pressure transmitter devices include pressure transmitters for measuring an absolute pressure and differential pressure transmitters for measuring a differential pressure. These pressure transmitter devices are used in nuclear power plants, petroleum refining plants, and the like and thus required of an accuracy of, for example, +/−1% in order to secure safety in the plant or to ensure product quality. However, it has been difficult to maintain the accuracy for a long term due to influence by hydrogen permeated from the outside of the pressure transmitter device.

For example, a part of hydrogen (hydrogen molecule, hydrogen atom, and hydrogen radical) contained in a measuring fluid permeates through the diaphragm. Thereafter, the permeated hydrogen accumulates in the fill fluid filling the hydraulic path in the form of bubbles. Moreover, the fill fluid decomposes due to radiation or heat, thereby generating a hydrogen radical or a hydrocarbon radical such as a methyl radical. Furthermore, these radicals are bonded with each other and thereby generate hydrogen molecules or hydrocarbon such as methane. Similarly to the aforementioned hydrogen that permeates through the diaphragm, the above also accumulates inside the hydraulic path. In this manner, when hydrogen bubbles or hydrocarbon bubbles accumulate inside the hydraulic path, a pressure inside the hydraulic path increases and a variation in the pressure applied to the diaphragm is not correctly transferred to the sensor. This results in a decreased measurement accuracy.

Meanwhile, a technique disclosed in JP-2014-089171-A is known to suppress accumulation of hydrogen bubbles or hydrocarbon bubbles inside a hydraulic path. JP-2014-089171-A discloses a pressure/differential pressure transmitter where a hydraulic path is filled with a fill fluid for transferring a pressure and a space is formed between a diaphragm and a wall surface on a main body side. The pressure/differential pressure transmitter includes the hydraulic path connected to the wall surface on the main body side and transfers a pressure received by the diaphragm to a sensor via the fill fluid filled in the space and hydraulic path, where a hydrogen occlusion material for occluding hydrogen atoms in the fill fluid is provided to at least a part of the fill fluid, wall surface on the main body side, and a section between the wall surface on the main body side and the sensor.

SUMMARY OF THE INVENTION

With the technique disclosed in JP-2014-089171-A, generation of hydrogen bubbles is suppressed by allowing the hydrogen occlusion material to occlude hydrogen generated through a contact between the hydrogen occlusion material and hydrocarbon. Moreover, generation of hydrocarbon bubbles is also suppressed by allowing a surface of the hydrogen occlusion material to absorb hydrocarbon generated through a contact with the hydrogen occlusion material (refer to paragraph 0028 in the above literature). Under an environment of high radiation dose (e.g. an integrated value of 1 MGy or more) or high temperature (e.g. 400° C. or more), however, a large amount of hydrocarbon may be generated, in which case hydrocarbon bubbles are likely to be generated.

When hydrocarbon bubbles are likely to be generated, a pressure in the hydraulic path is likely to increase. When the pressure in the hydraulic path increases, an accuracy of an allowable error of a pressure transmitter device (e.g. accuracy of +/−1%) decreases and thus a maintenance work for recovery is important. Moreover, upon the maintenance work, replacement of parts may be required to maintain an accuracy of the allowable error of, for example +/−1%. Such replacement cost is likely to accumulate. Such problems greatly matter especially when a generation amount of hydrocarbon bubbles increases.

The present invention has been devised in consideration to these circumstances. A problem that the present invention intends to solve is to provide a pressure transmitter device that ensures to suppress generation of hydrocarbon bubbles and hydrogen bubbles where a measurement error is preferably maintained for a long term with a longer service life.

The present inventors have conducted earnest investigation in order to solve the aforementioned problems and have found that the aforementioned problems can be solved by disposing both of a hydrogen occlusion material for occluding hydrogen and a hydrocarbon absorbing material for absorbing hydrocarbon in the hydraulic path.

The present invention provides a pressure transmitter device that ensures to suppress generation of hydrocarbon bubbles and hydrogen bubbles where a measurement error is preferably maintained for a long term with a longer service life.

DESCRIPTION OF THE PREFERRED EMBODIMENTS

An embodiment (present embodiment) for carrying out the present invention will be described below with reference to the drawings as appropriate.

Figure 1:
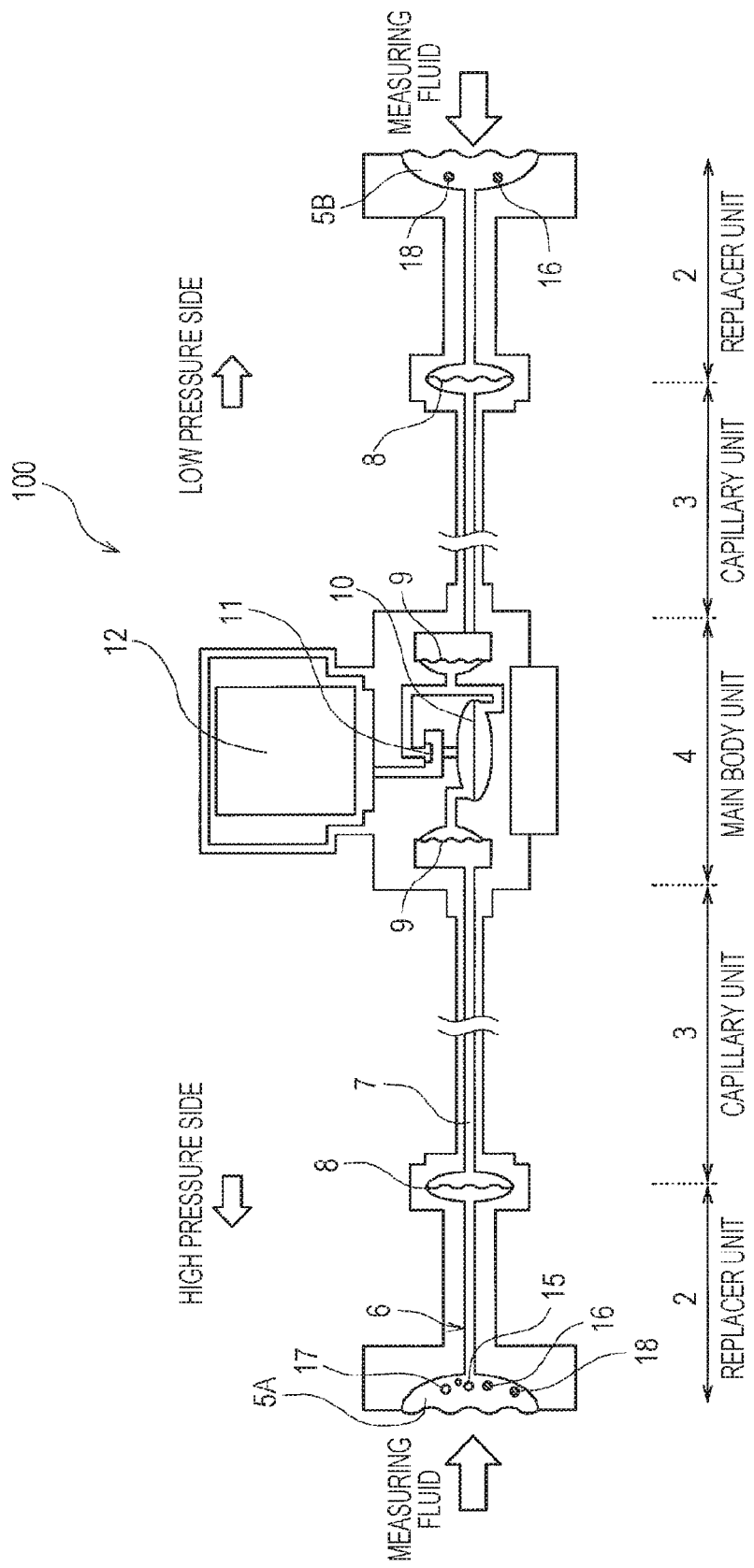
FIG. 1 is a diagram for describing a differential pressure transmitter as an exemplary pressure transmitter device according to the present embodiment.

FIG. 1 is a diagram for describing a differential pressure transmitter 100 as an exemplary pressure transmitter device according to the present embodiment. The differential pressure transmitter 100 measures a differential pressure between a measuring fluid on a high pressure side and a measuring fluid on a low pressure side. The differential pressure transmitter 100 illustrated in FIG. 1 includes replacer units 2, capillary units 3, and a main body unit 4. Of the above, with the main body unit 4 disposed in the center, the replacer unit 2 and capillary unit 3 are included on the high pressure side of the measuring fluid while the other replacer unit 2 and capillary unit 3 are included on the low pressure side of the measuring fluid.

In the differential pressure transmitter 100, a pressure from the measuring fluid on the high pressure side is received by a pressure receiving diaphragm 5A in contact with the measuring fluid while a pressure from the measuring fluid on the low pressure side is received by a pressure receiving diaphragm 5B in contact with that measuring fluid. These pressure receiving diaphragms 5A and 5B and a sensor 11 (pressure receiving sensor) are connected with each other by a hydraulic path 6 filled with a fill fluid 7. The sensor 11 will be described later. Each of the pressures received by the pressure receiving diaphragms 5A and 5B is transferred to the sensor 11 by the fill fluid 7 filled in the hydraulic path 6 via intermediate diaphragms 8, seal diaphragms 9, and a central diaphragm 10. The pressures received by the sensor 11 is converted into electrical signals by a converting device not illustrated and then input to an output circuit 12 via an electrical signal line not illustrated. The input pressure values are then output externally. A value output here is obtained by measuring a differential pressure between the measuring fluids based on the pressures received by the sensor 11.

Moreover, in the differential pressure transmitter 100, the fill fluid 7 fills not only between the pressure receiving diaphragms 5 and intermediate diaphragms 8 but also between the intermediate diaphragms 8 and seal diaphragms 9, between the seal diaphragms 9 and central diaphragm 10, and between the central diaphragm 10 and sensor 11. Each of these intervals are included in the hydraulic path 6.

The pressure receiving diaphragms 5A and 5B included in the differential pressure transmitter 100 easily allow hydrogen to permeate therethrough from the outside. Therefore, in the differential pressure transmitter 100, each of inner surfaces of the pressure receiving diaphragms 5A and 5B is gold-plated. This allows for suppressing permeation of hydrogen from the outside, thereby substantially suppressing accumulation of hydrogen. Incidentally, suppressing a permeation amount of hydrogen from the outside results in suppressing a permeation amount of hydrogen from the inside to the outside. In the differential pressure transmitter 100 of the present embodiment, however, even when a generation amount of methane 22 or hydrogen molecule 24 (refer to FIG. 4 for both) increases due to no permeation of hydrogen, generation of their bubbles can be suppressed since a hydrocarbon absorbing material 16 and a hydrogen occlusion material 18 are provided.

Although details are described later, decomposition of the fill fluid 7 with heat, radiation, or the like generates bubbles of hydrocarbon 15 (hereinafter referred to as "hydrocarbon bubbles 15") or bubbles of hydrogen 17 (hereinafter referred to as "hydrogen bubbles 17"). That is, when hydrocarbon or hydrogen is generated and the generation amount thereof exceeds a dissolvable upper limit amount in the fill fluid 7, the hydrocarbon bubbles 15 or hydrogen bubbles 17 are generated. Note that "hydrocarbon" referred to includes, for example, methane, ethane, and propane.

Especially, as the pressure of the measuring fluid to be measured by the differential pressure transmitter 100 is closer to that of a vacuum, a pressure inside the hydraulic path 6 decreases. Therefore, in such a circumstance, the dissolvable upper limit amount decreases and the hydrocarbon bubbles 15 or hydrogen bubbles 17 are likely to be generated. Moreover, even though the pressure receiving diaphragms 5A and 5B are gold-plated as described above, hydrogen may permeate into the inside from the pressure receiving diaphragms 5A and 5B.

When an internal pressure of the hydraulic path 6 increases due to the hydrocarbon bubbles 15 or hydrogen bubbles 17, variations in the pressures applied to the pressure receiving diaphragms 5A and 5B cannot be correctly transferred to the sensor 11. Therefore, a measurement accuracy decreases. Especially, when an amount of gas forming bubbles inside the hydraulic path 6 on the high pressure side and an amount of gas forming bubbles inside the hydraulic path 6 on the low pressure side are different, pressure values depart from normal values, thereby resulting in a large error.

Therefore, in the differential pressure transmitter 100, the hydrocarbon absorbing material 16 for absorbing hydrocarbon and the hydrogen occlusion material 18 for occluding hydrogen are disposed near the pressure receiving diaphragms 5A and 5B, which are closest to the measuring fluids and are especially prone to influence by radiation or heat. Here, the hydrocarbon absorbing material 16 and hydrogen occlusion material 18 are disposed in the fill fluid 7 in a mixed manner in the embodiment illustrated in FIG. 1; however, the hydrocarbon absorbing material 16 and hydrogen occlusion material 18 may be disposed, for example, in a film shape to cover an inner wall surface of the hydraulic path 6. The hydrocarbon absorbing material 16 and hydrogen occlusion material 18 suppress generation of the hydrocarbon bubbles 15 and hydrogen bubbles 17. Even when such bubbles are generated, absorption or occlusion thereof suppresses pressure variations inside the hydraulic path 6, thereby resulting in a long service life of the differential pressure transmitter 100.

Moreover, since the hydrogen radical 27 is absorbed by the hydrocarbon absorbing material 16 in a state of methane 22 while bonded to a methyl radical 26, an amount of the hydrogen radical 27 occluded by the hydrogen occlusion material 18 can be reduced as compared to a case of providing the hydrogen occlusion material 18 only. This allows for reducing an amount of the hydrogen occlusion material 18 used. The hydrogen occlusion material 18 is generally expensive and thus this allows for reducing the cost.

Figure 2:
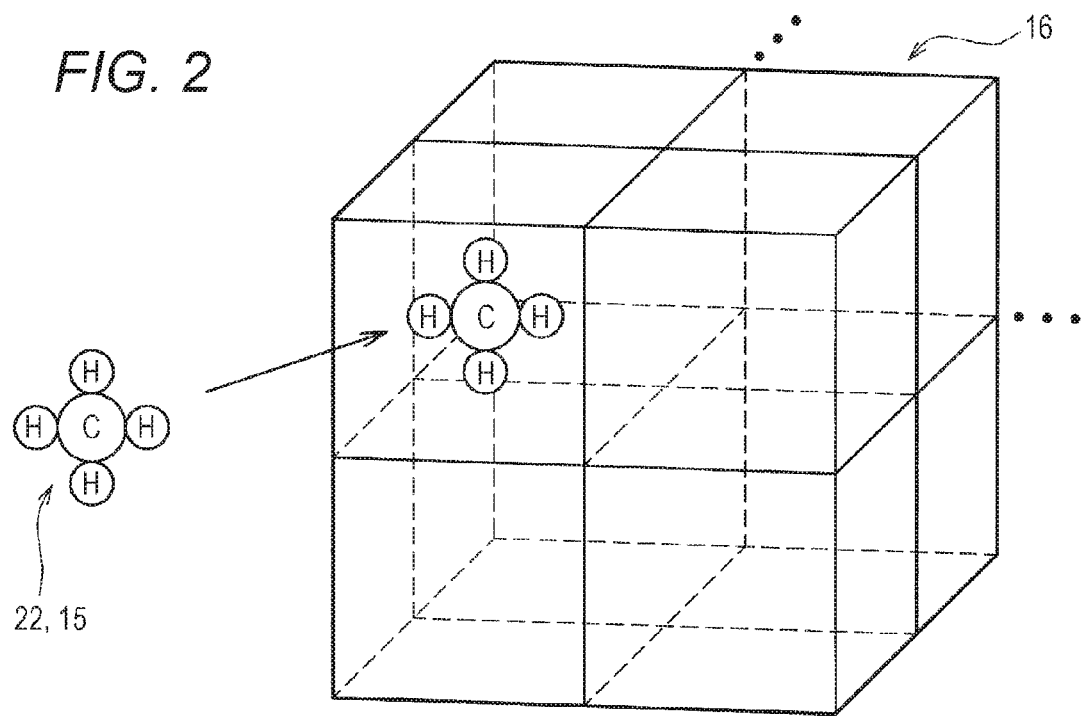
FIG. 2 is a diagram for describing a method of absorbing hydrocarbon by a hydrocarbon absorbing material.

FIG. 2 is a diagram for describing a method of absorbing hydrocarbon by the hydrocarbon absorbing material 16. In FIG. 2, methane 22 is illustrated as an example of hydrocarbon. In the differential pressure transmitter 100, zeolite is used as the hydrocarbon absorbing material 16. Zeolite is a porous body and thus methane 22 is absorbed inside a pore of zeolite forming the hydrocarbon absorbing material 16. Incidentally, other than zeolite, the hydrocarbon absorbing material 16 may be activated carbon, a porous polymer material (porous film or the like), or the like. One of the above may be used solely. Alternatively, two or more of the above may be used at an arbitrary ratio and combination. Of the above, for example zeolite and activated carbon can be easily made into a power form and thus have an advantage that dispersing entirely over the fill fluid 7 can be easily attained. Moreover, a powder form can increase an area in contact with the fill fluid 7, thereby allowing for more effective absorption of hydrocarbon. Furthermore, for example a porous polymer material has an advantage of reducing product cost.

Also, the hydrocarbon absorbing material 16 may be in a powder form, plate shape, rod shape (wire shape), film shape, etc. When a plurality of hydrocarbon absorbing materials 16 is provided, the above shapes may be combined as appropriate for disposition. Of the above, for example the powder form has the aforementioned advantage. Alternatively, the plate shape requires no special processing and thus has an advantage of reducing manufacturing cost. The rod shape allows for easy installment in the hydraulic path 6 when the hydraulic path 6 has a fine capillary shape. Furthermore, a surface of the hydrocarbon absorbing material 16 of such a rod shape may carry the hydrogen occlusion material 18 of a granular shape. A film shape allows for large freedom for an installation position and thus measuring performance of the pressure transmitter device can be maintained especially high.

Figure 3:
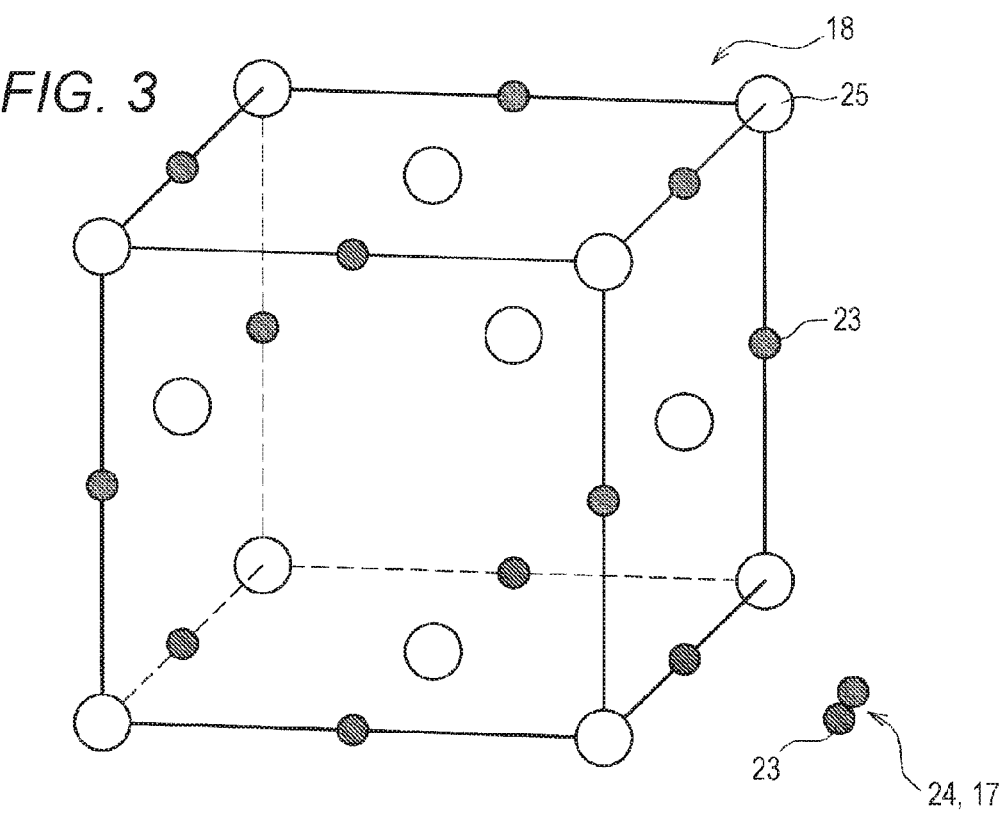
FIG. 3 is a diagram for describing a method of occluding hydrogen by a hydrogen occlusion material.

FIG. 3 is a diagram for describing a method of occluding hydrogen by the hydrogen occlusion material 18. In the differential pressure transmitter 100, palladium 25 is used as the hydrogen occlusion material 18. Palladium 25 is an atom of a face-centered cubic lattice structure. In the hydrogen occlusion material 18, a plurality of palladium atoms 25 is disposed at positions in the face-centered cubic lattice. A hydrogen atom 23 that forms a hydrogen molecule (hydrogen) 24 is disposed between adjacent palladiums 25 in the hydrogen occlusion material 18 and thereby occluded therein. Incidentally, the hydrogen occlusion material 18 formed by palladium is capable of occluding hydrogen atoms a volume of which is 935 times a volume of the hydrogen occlusion material 18 itself.

Other than palladium, the hydrogen occlusion material 18 may be magnesium, vanadium, titanium, manganese, zirconium, nickel, lithium, niobium, cobalt, calcium, or an alloy thereof. Also, the hydrogen occlusion material 18 may be in a metal plate shape, wire shape, powder form, or a combination thereof.

Figure 4B:
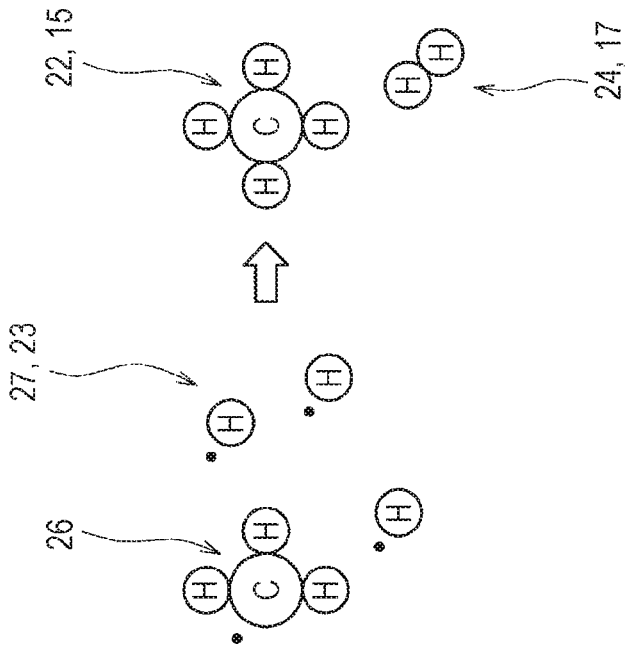
FIG. 4A is a structural formula of a fill fluid and FIG. 4B is a diagram illustrating a radial species generated when the fill fluid is decomposed with radiation or heat.
Figure 4A:
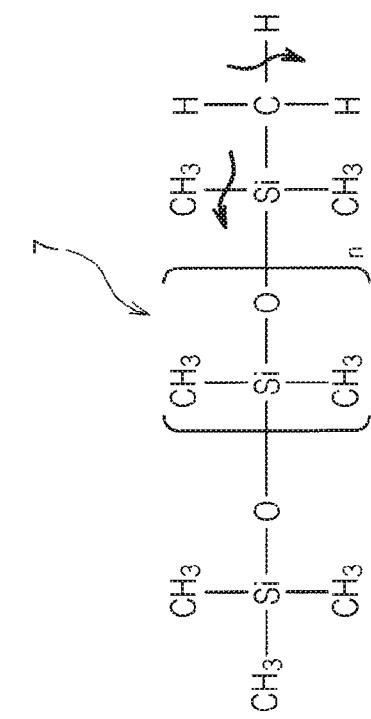

FIG. 4A is a structural formula of the fill fluid 7 to fill the hydraulic path 6 and FIG. 4B is a diagram illustrating a radial species generated when the fill fluid 7 is decomposed with radiation or heat. The fill fluid 7 used in the differential pressure transmitter 100 includes silicone oil having a configuration illustrated in FIG. 4A. When this silicone oil receives intensive radiation such as γ rays or intense heat of, for example, more than 310° C., bonds in the silicone oil are cut at positions indicated by bold solid arrows in FIG. 4A. As a result, the methyl radical 26 (hydrocarbon radical) and the hydrogen radical 27 (namely, the hydrogen atom 23 having been described with reference to FIG. 3) as illustrated in FIG. 4B are generated.

Since the methyl radical 26 and hydrogen radical 27 are unstable, these radicals reacts with other radicals existing in surroundings thereof and form a molecule. Specifically, the methyl radical 26 forms ethane (an example of hydrocarbon, which is not illustrated in FIG. 4) when bonded with another methyl radical 26 or methane 22 (hydrocarbon bubbles 15) when bonded with the hydrogen radical 27. Furthermore, the hydrogen radical 27 forms the hydrogen molecule 24 (hydrogen bubbles 17) when bonded with another hydrogen radical 27.

Here, in the differential pressure transmitter 100 of the present embodiment, the hydrocarbon absorbing material 16 and hydrogen occlusion material 18 are provided in the fill fluid 7. Therefore, the hydrogen radical 27 generated with radiation, heat, or the like is occluded by the hydrogen occlusion material 18 (refer to FIG. 3). This allows for suppressing reaction of the hydrogen radical 27 with another hydrogen radical 27 or methyl radical 26 and thereby generating the hydrogen molecule 24 or methane 22. Note that the methyl radical 26 has low reactivity and thus is unlikely to react with another methyl radical 26. Thus, generated is a trace of methane 22.

With a high radiation dose (e.g. an integrated value of 1 MGy or more) or high temperature (e.g. 400° C. or more), however, an generated amount of the hydrogen radical 27 or methyl radical 26 increases. Therefore, the hydrogen occlusion material 18 may have low effect in suppressing generation of methane 22. In the differential pressure transmitter 100 of the present embodiment, however, the hydrocarbon absorbing material 16 is provided in addition to the hydrogen occlusion material 18. Therefore, even when the hydrogen radical 27 and methyl radical 26 are bonded with each other to generate methane 22, the generated methane 22 (hydrocarbon) is absorbed by the hydrocarbon absorbing material 16. Therefore, generation of hydrocarbon bubbles 15 such as methane bubbles is suppressed.

Figure 5:
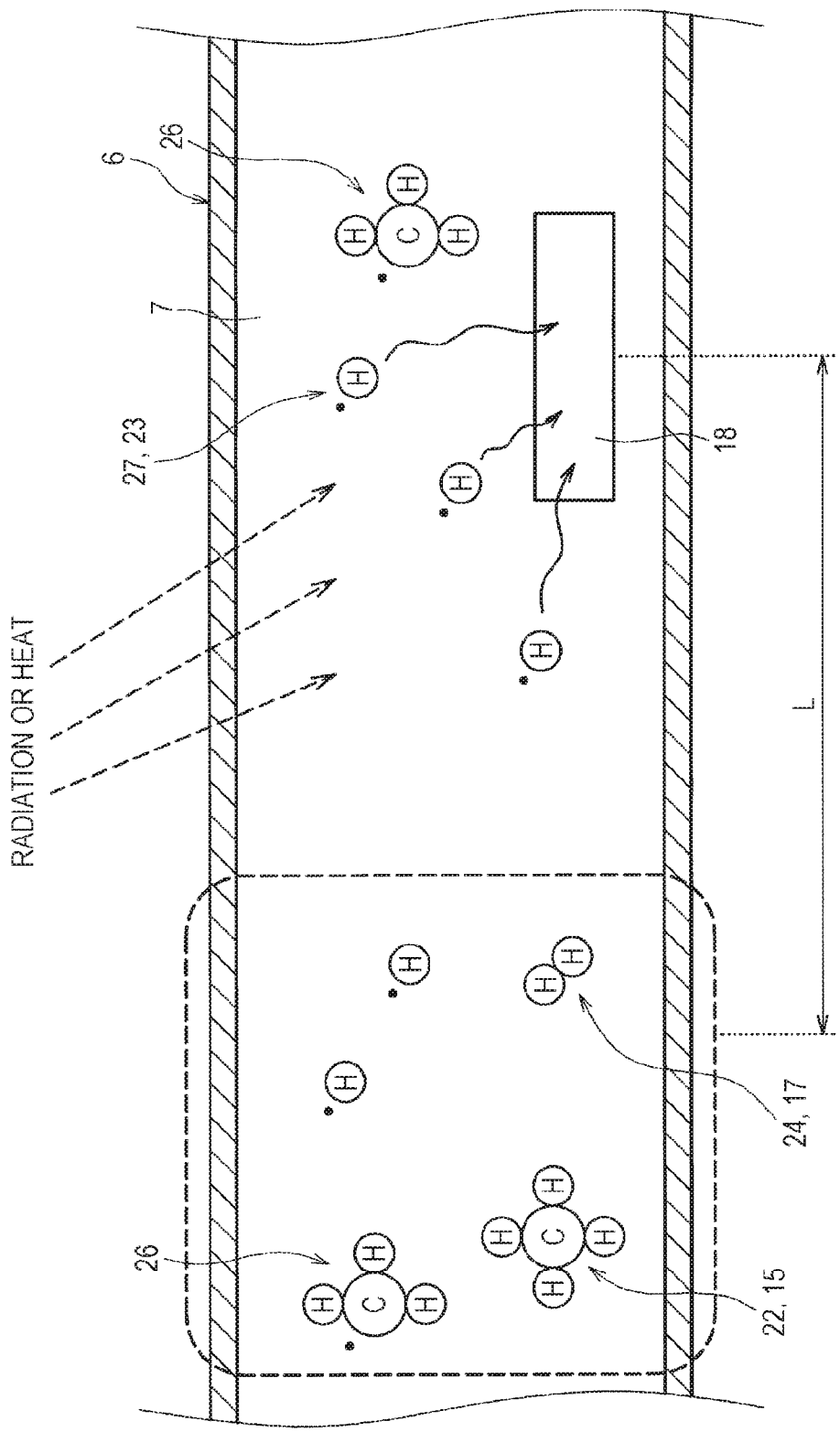
FIG. 5 is a diagram illustrating generation of hydrocarbon in a position apart from the hydrogen occlusion material.

FIG. 5 is a diagram illustrating generation of hydrocarbon in a position apart from a hydrogen occlusion material 18. A distance L from the hydrogen occlusion material 18 will be described later with reference to FIG. 6. When the fill fluid 7 decomposes to generate the methyl radical 26, a position where the methyl radical 26 is generated may be far from a position where the hydrogen occlusion material 18 is disposed. In such a case, the hydrogen occlusion material 18 has low effect in occluding a hydrogen radical 27. Therefore, the generated methyl radical 26 is bonded with the hydrogen radical 27 in the vicinity thereof and thus hydrocarbon such as methane 22 is likely to be generated. Such a phenomenon is more apparent when the hydrogen occlusion material 18 is farther from the position where decomposition of a fill fluid 7 occurs.

Figure 6:
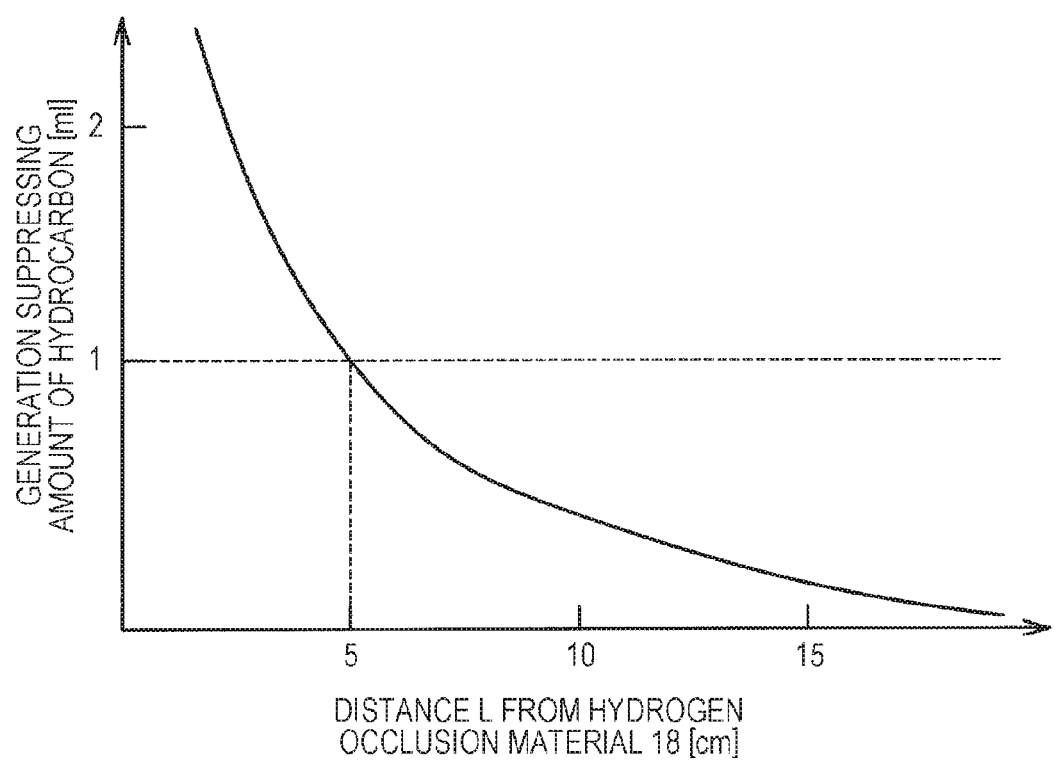
FIG. 6 is a graph illustrating a relationship between a distance L from the hydrogen occlusion material and a generation suppressing amount of hydrocarbon thereat.

FIG. 6 is a graph illustrating a relationship between a distance L from the hydrogen occlusion material 18 and a generation suppressing amount of hydrocarbon thereat. The distance L here corresponds to the distance L illustrated in FIG. 5. As illustrated in FIG. 6, as the distance L from the hydrogen occlusion material 18 becomes larger, the generation suppressing amount of hydrocarbon decreases. This shows that, in the vicinity of the hydrogen occlusion material 18, the hydrogen radical 27 is likely to be absorbed as described above, resulting in suppression of an generated amount of hydrocarbon and thereby suppressing generation of hydrocarbon bubbles 15. On the other hand, in a position far from the hydrogen occlusion material 18, the hydrogen radical 27 is unlikely to be occluded and thus likely to be bonded with the methyl radical 26 to generate the methane 22. Therefore, in such a case, the generation suppressing amount of hydrocarbon such as the methane 22 decreases. That is, the hydrocarbon bubbles 15 are likely to be generated.

Especially, as the distance L from the hydrogen occlusion material 18 becomes larger, the generation suppressing amount of hydrocarbon drastically decreases. That is, an generated amount of hydrocarbon drastically increases. Here, an amount of the fill fluid 7 used is normally approximately 40 mL although the amount depends on the length, thickness, etc. of the hydraulic path 6 in the differential pressure transmitter 100. In the fill fluid 7 of such an amount, approximately 1 mL of hydrocarbon can be usually dissolved. That is, when the generated amount of hydrocarbon is up to approximately 1 mL, the generated hydrocarbon is dissolved in the fill fluid 7 and thus the hydrocarbon bubbles 15 is unlikely to occur (refer to FIG. 1). Therefore, it is preferable that the hydrocarbon absorbing material 16 is disposed at a position where the distance L from the hydrogen occlusion material 18 is 5 cm or less with the generation suppressing amount of hydrocarbon being 1 mL or more.

Figure 7:
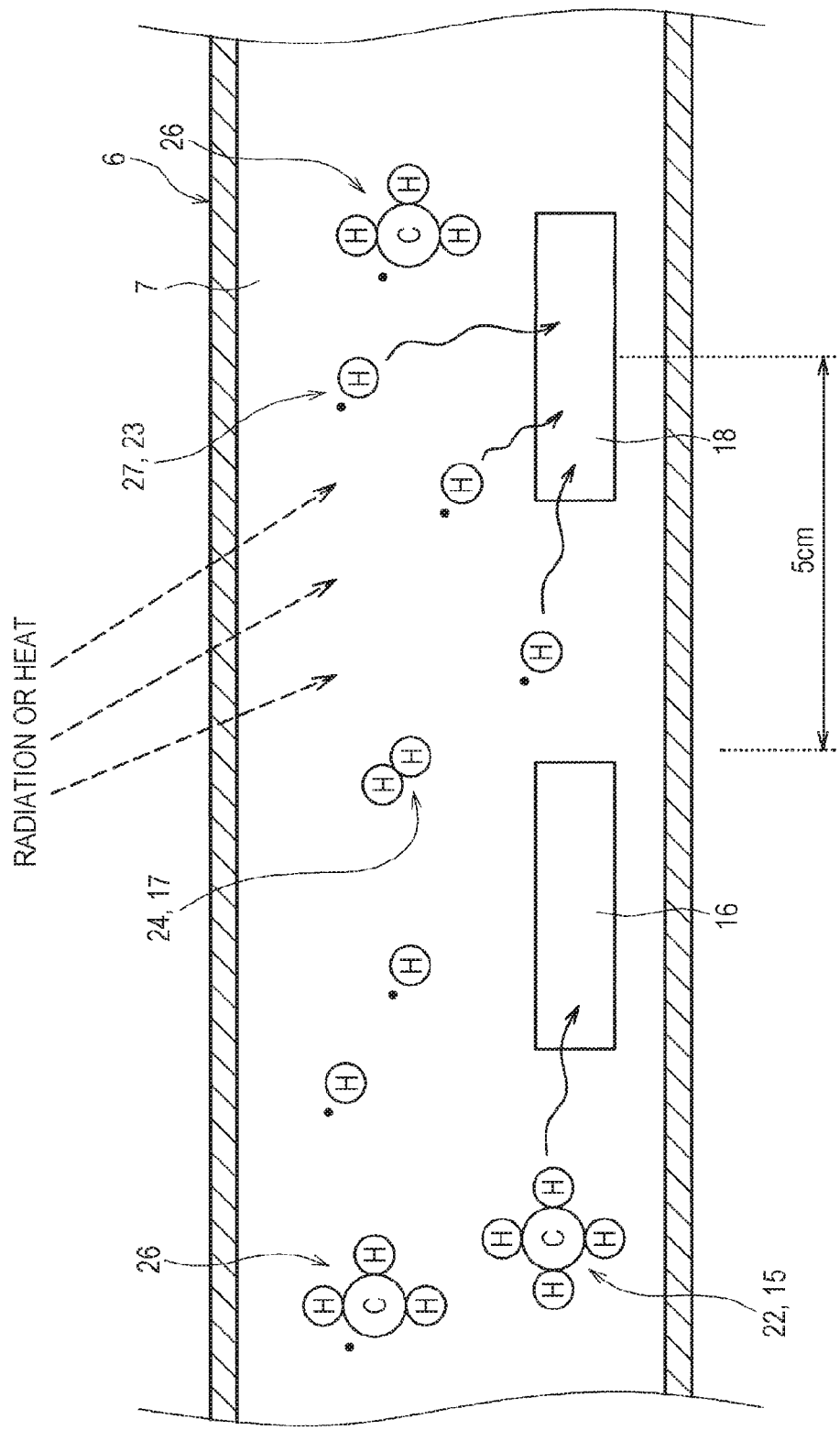
FIG. 7 is a diagram illustrating absorption of hydrocarbon by a hydrocarbon absorbing material disposed at a position apart from a hydrogen occlusion material.

FIG. 7 is a diagram illustrating absorption of hydrocarbon 15 by a hydrocarbon absorbing material 16 disposed at a position apart from a hydrogen occlusion material 18. In FIG. 7, the hydrocarbon absorbing material 16 and hydrogen occlusion material 18 of a plate shape are illustrated. As described above, when a distance from the hydrogen occlusion material 18 exceeds 5 cm, the hydrocarbon bubbles 15 are likely to be generated. Therefore, it is preferable that the hydrocarbon absorbing material 16 is disposed at a position where the generated amount of hydrocarbon is large due to a distance from the hydrogen occlusion material 18, more specifically, at a position approximately 5 cm apart from the hydrogen occlusion material 18. Moreover, it is preferable that a plurality of sets of at least one hydrocarbon absorbing material 16 and at least one hydrogen occlusion material 18 is provided at an interval of approximately 5 cm or less. Disposing the hydrocarbon absorbing material 16 and hydrogen occlusion material 18 in such a positional relation allows for substantially suppressing generation of the hydrocarbon bubbles 15 and hydrogen bubbles 17 (refer to FIG. 1 for both).

Incidentally, an embodiment where the hydrocarbon absorbing material 16 and hydrogen occlusion material 18 are disposed alternately at an interval of approximately 5 cm or less may be, for example, "the hydrocarbon absorbing material 16, hydrocarbon absorbing material 16, hydrocarbon absorbing material 16, and hydrogen occlusion material 18", "hydrocarbon absorbing material 16, hydrogen occlusion material 18, hydrocarbon absorbing material 16, and hydrocarbon absorbing material 16", or "hydrocarbon absorbing material 16, hydrogen occlusion material 18, hydrocarbon absorbing material 16, hydrogen occlusion material 18, and hydrocarbon absorbing material 16" disposed in the order mentioned at an interval of approximately 5 cm or less.

Figure 8:
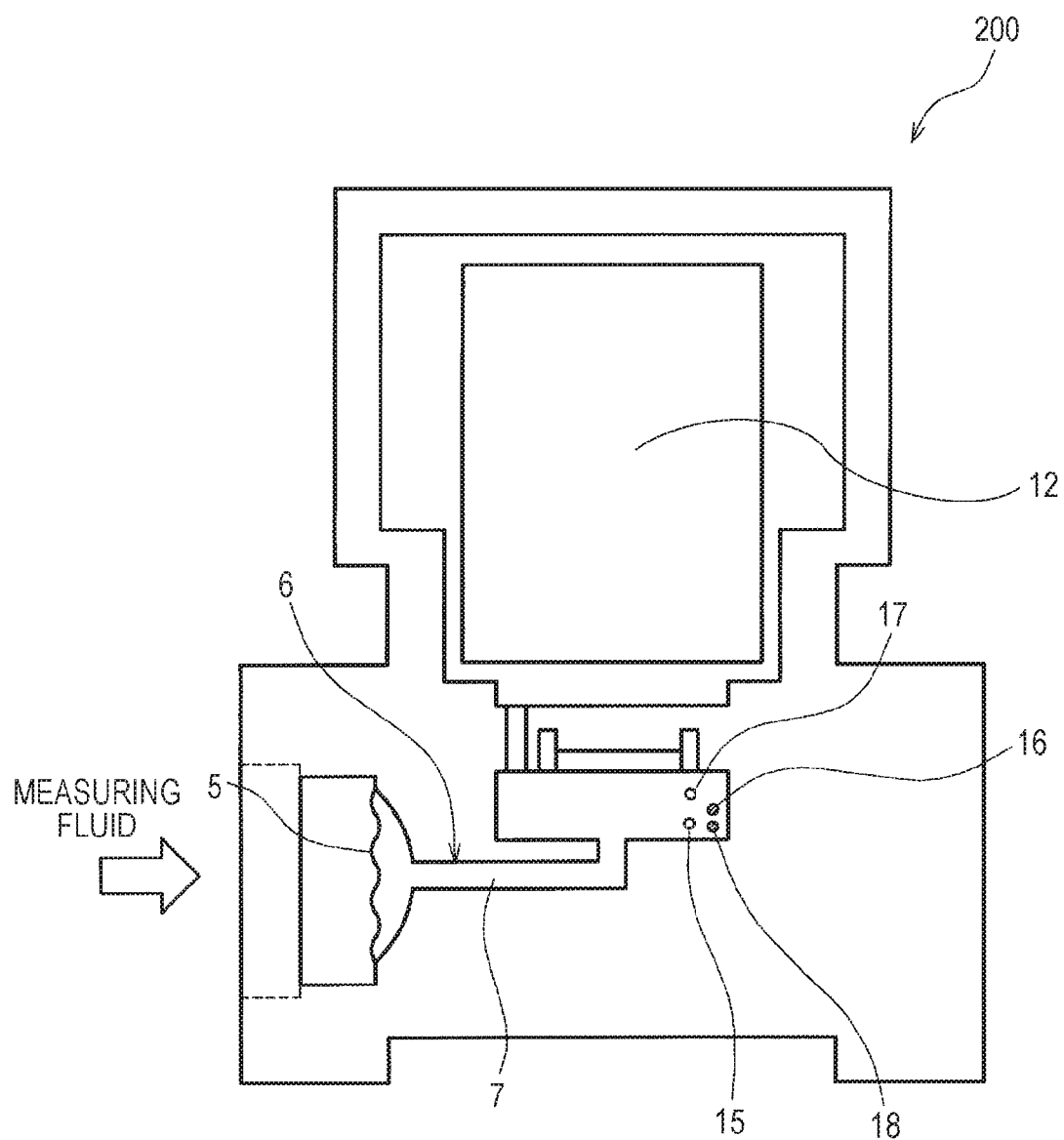
FIG. 8 is a diagram for describing a pressure transmitter as another exemplary pressure transmitter device according to the present embodiment.

Furthermore, in the first embodiment, the differential pressure transmitter 100 has been described as an exemplary pressure transmitter device according to the present embodiment. However, the pressure transmitter device of the present embodiment may be a pressure transmitter 200 illustrated in FIG. 8. In FIG. 8, the same element as that of the differential pressure transmitter 100 illustrated in FIG. 1 is denoted with the same sign and detailed descriptions thereon are omitted.

The pressure transmitter 200 illustrated in FIG. 8 measures an absolute pressure of a measuring fluid. In the pressure transmitter 200, a pressure of the measuring fluid is received by a pressure receiving diaphragm 5. The received pressure is then input to an output circuit 12 similarly to the aforementioned differential pressure transmitter 100. The pressure is then externally output as a pressure value. The value output here is obtained by measuring an absolute pressure of the measuring fluid based on the pressure received by a sensor 11.

Also in the pressure transmitter 200, similarly to the aforementioned differential pressure transmitter 100, hydrogen permeated through the pressure receiving diaphragm 5 and entered inside thereof or hydrogen and hydrocarbon generated therein may form bubbles. With these bubbles, an inner pressure of a hydraulic path 6 may depart from a normal value, thus resulting in a large measurement error. Thus, a hydrocarbon absorbing material 16 and a hydrogen occlusion material 18 are also provided in the pressure transmitter 200.

Specifically, also in the pressure transmitter 200, the hydrocarbon absorbing material 16 is provided in a fill fluid 7 inside a hydraulic path 6 or disposed in a film shape to cover an inner wall surface of the hydraulic path 6. Similarly, the hydrogen occlusion material 18 is also provided in the fill fluid 7 inside the hydraulic path 6 or disposed in on the inner wall surface of the hydraulic path 6. This allows for substantially suppressing generation of hydrocarbon bubbles 15 or hydrogen bubbles 17 also in the pressure transmitter 200.

The present embodiment has been described with specific examples; however, the present invention is not limited thereto.

For example, in the aforementioned embodiment, the inner surfaces of the pressure receiving diaphragms 5, 5A, and 5B are gold-plated. However, gold plating may be applied to outer surfaces of the pressure receiving diaphragms 5, 5A, and 5B. Furthermore, gold plating may be applied to both of the inner surfaces and outer surfaces of the pressure receiving diaphragms 5, 5A, and 5B.

Furthermore, for example, a configuration of the fill fluid 7 is not limited to the one illustrated in FIG. 4A and any fill fluid may be used.

What is claimed is:

1. A pressure transmitter device comprising:
   a pressure receiving diaphragm in contact with a measuring fluid;
   a fill fluid which is in contact with an opposite side of the pressure receiving diaphragm to the other side in contact with the measuring fluid and is configured to transfer a pressure received by the pressure receiving diaphragm from the measuring fluid to a pressure receiving sensor disposed at a position apart from the pressure receiving diaphragm;
   a hydraulic path which is filled with the fill fluid and is configured to connect the pressure receiving diaphragm and the pressure receiving sensor; and
   an output circuit configured to measure and to output an absolute pressure of the measuring fluid or a differential pressure between measuring fluids based on the pressure received by the pressure receiving sensor,
   wherein a hydrocarbon absorbing material for absorbing hydrocarbon and a hydrogen occlusion material for occluding hydrogen are provided inside the hydraulic path, and
   wherein the hydrogen occlusion material and the hydrocarbon absorbing material are separately provided inside the hydraulic path at an interval of 5 cm or less.

2. The pressure transmitter device according to claim 1, wherein hydrocarbon generated inside the hydraulic path is absorbed by the hydrocarbon absorbing material.

3. The pressure transmitter device according to claim 1, wherein the hydrocarbon absorbing material includes at least one species selected from a group consisting of zeolite, activated carbon, and a porous polymer.

4. The pressure transmitter device according to claim 1, wherein the hydrocarbon absorbing material has at least one type of shape selected from a group consisting of a powder form, a plate shape, a rod shape, and a film shape.

5. The pressure transmitter device according to claim 1,
wherein the fill fluid generates a hydrogen radical and a hydrocarbon radical by being decomposed with radiation, and
the hydrocarbon absorbing material is configured to absorb hydrocarbon resulting from the generated hydrogen radical and the hydrocarbon radical bonded with each other.

6. The pressure transmitter device according to claim 1,
wherein, of the pressure receiving diaphragm, at least one of a surface in contact with the measuring fluid and another surface in contact with the fill fluid is gold-plated.

7. The pressure transmitter device according to claim 1,
wherein the hydrogen occlusion material and the hydrocarbon absorbing material are provided inside the hydraulic path in plurality, and at least one of the hydrogen occlusion material and at least one of the hydrocarbon absorbing material are separated by at the interval of 5 cm or less.

* * * * *